Patented Dec. 25, 1951

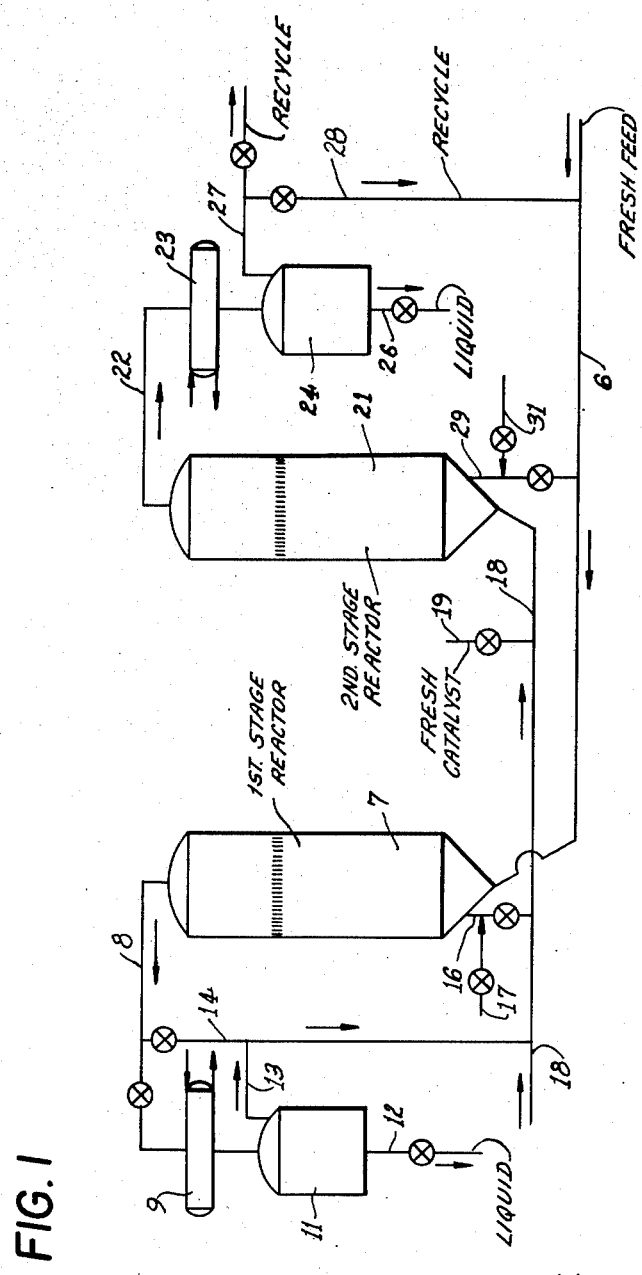

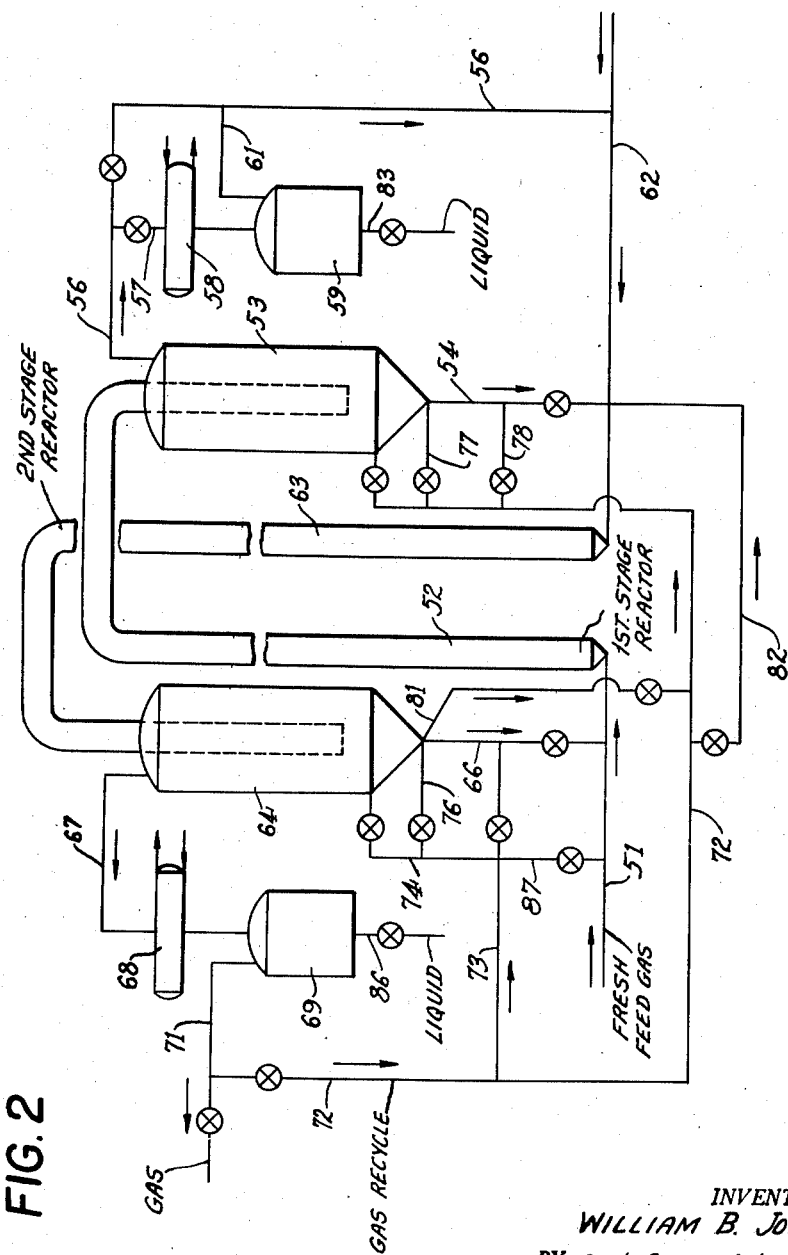

2,579,828

UNITED STATES PATENT OFFICE 2,579,828

SYNTHESIS OF ORGANIC COMPOUNDS

William Benedict Johnson, Far Hills, N. J., assignor to The M. W. Kellogg Company, Jersey City, N. J., a corporation of Delaware Application May 12, 1948, Serial No. 26,595

4 Claims. (Cl. 260—449.6)

This invention relates to an improved process for the hydrogenation of carbon oxides with finely divided contact material suspended or entrained in the reaction mixture to produce normally liquid organic compounds. The improved process is applicable in reacting hydrogen with organic compounds containing the carbonyl group and herein designated as carbon oxides, such as carbon monoxide, carbon dioxide, ketones, aldehydes, acyl halides, organic acids and their salts and esters, acid anhydrides, and amines. In the following description of the invention the hydrogenation of carbon monoxide will be referred to specifically. It will be understood, however, that the invention is of wider application including within its scope the hydrogenation of any suitable carbon oxide.

Hydrogen and carbon monoxide react exothermically in the presence of certain catalysts under specific reaction conditions to form hydrocarbons having more than one carbon atom per molecule and oxygenated organic compounds. In general, the synthesis of organic compounds by the hydrogenation of carbon monoxide is accomplished in the presence of a metal or metal oxide, such as one selected from group VIII of the periodic table, as a catalyst at pressures below about 500 pounds per square inch gage and at temperatures below about 750° F.

The synthesis feed gas or reaction mixture comprises a mixture of 1 to 5 mols of hydrogen per mol of carbon monoxide and may be prepared by various methods, including the catayltic conversion of natural gas, steam and carbon dioxide, the partial oxidation of natural gas, or the gasification of coal with steam and oxygen.

Most recent developments in the synthesis of organic compounds from hydrogen and carbon monoxide have involved the use of finely divided cataylsts entrained or suspended in the reaction mixture in the reaction zone. These types of operations have several apparent advantages over the conventional fixed or stationary bed operations and have yielded organic compounds of high quality and in larger quantity per pound of catalyst. For example, the hydrogenation of carbon monoxide in the presence of a fluidized reduced iron cataylst at a temperature of about 600° F. and at superatmospheric pressures has resulted in the yield of oil and water of about 100 to about 130 cc. per cubic meter of fresh feed and about 60 to 120 cc. per cubic meter of fresh feed, respectively.

Present operations indicate that a relatively low mol ratio of hydrogen to carbon monoxide and relatively high conversions of carbon monoxide are desirable from the standpoint of initial investment and operating cost. However, further indications are to the effect that the relatively low ratios of hydrogen to carbon monoxide, such as a mol ratio below about 2:1, and relatively high conversions per pass, such as conversions above about 80 per cent of carbon monoxide, cause a rapid deactivation of the catalyst and agglomeration or deaeration of the fluidized catalyst partially as the result of the accumulation of wax and carbon upon finely divided particles of catalyst. In order to maintain such high conversions with present methods of operation, large quantities of the gaseous components of the effluent must be recycled to the reactor which in turn results in large diameter vessels and piping, increased compressor loads, and a low level of heat removal of the exothermic heat of reaction. In order to overcome the rapid deactivation of the catalyst and its tendency to agglomerate and deaerate in fluidized systems, present practice involves continuous or intermittent removal of at least a portion of the catalyst in the reaction zone and its regeneration which in turn results in costly operations and a relatively inflexible process. It is much to be desired, therefore, to provide a process for overcoming the above difficulties to prevent rapid deactivation and deaeration of the catalyst and to obtain relatively high conversions of carbon monoxide per pass.

It is an object of this invention to provide an improved process for the hydrogenation of carbon monoxide with a fluidized finely divided catalyst.

It is another object of this invention to provide a process for minimizing or eliminating the necessity of regeneration of the catalyst in the hydrogenation of carbon monoxide by preventing the accumulation of waxes and other relatively high boiling compounds upon the catalyst.

Still a further object of the present invention is to provide a process for increasing the carbon monoxide conversion per pass in the hydrogenation of carbon monoxide.

Another object of the present invention is to provide a process for the hydrogenation of carbon monoxide using an oxidized or partially oxidized catalyst, such as iron oxide.

Various other objects and advantages of the present invention will become apparent to those skilled in the art from the accompanying description and disclosure.

According to my invention a gaseous mixture comprising hydrogen and carbon monoxide is passed through a plurality of successive reaction zones containing finely divided contact material suspended or entrained in the reaction mixture therein. The reaction mixture in the first reaction zone is maintained at a relatively low mol ratio of hydrogen to carbon monoxide, and the reaction mixture in a subsequent reaction zone is maintained at a relatively high mol ratio of hydrogen to carbon monoxide. Contact material or catalyst is separated from the reaction mixture of the first reaction zone, stripped of waxes and high boiling organic compounds, and introduced into the reaction mixture of the subsequent reaction zone. From said subsequent reaction zone, sufficient contact material or catalyst is separated and returned to the first reaction zone to compensate for the contact material transferred therefrom to said subsequent reaction zone.

In the preferred embodiment of the present improved process, the first reaction zone is operated under the most appropriate operating conditions for producing relatively high yields of normally liquid and higher boiling organic compounds; exemplified by a hydrogen to carbon monoxide mol ratio not greater than about 2:1 and a carbon monoxide conversion between about 50 and about 70 per cent in combination, if desired, with any of the following additional operating conditions: a temperature below about 600° F. with an iron catalyst or below about 400° F. with a cobalt or a nickel catalyst, and a relatively high superatmospheric pressure. The last or subsequent reaction zone is operated under conditions favorable to the desorption of relatively high boiling organic compounds from the catalyst and substantially complete conversion of the carbon monoxide therein; exemplified by a hydrogen to carbon monoxide mol ratio above about 3:1 and a carbon monoxide conversion between about 80 and about 95 per cent in combination, if desired, with the following additional operating conditions: a temperature above about 610° F. with an iron catalyst and a temperature between about 410 and 460° F. with a cobalt or a nickel catalyst, and a relatively lower pressure than employed in said first reaction zone.

The contact material employed in the present invention is a finely divided powdered catalyst of a metal or metal oxide which is or becomes in the reaction zone a catalyst for the hydrogenation reaction. Finely divided metallic iron or iron oxides or a mixture of metallic iron and iron oxide are preferred examples of the catalyst employed in this invention. Other metals and metal oxides and combinations thereof may be employed which are effective in catalyzing the hydrogenation of carbon monoxide, such as cobalt, nickel, and other metals of group VIII of the periodic table. While the catalyst powder usually consists of such catalytic metals and their oxides, it may also include a minor amount of promoting ingredients, such as an alkali, alumina, silica, titania, thoria, manganese oxide and magnesia. Also, the catalyst may be supported on a suitable support, such as a bentonite type clay, for examples "Superfiltrol" which is an acid-treated bentonite clay, silica gel, alumina, and mixtures of these supports. In the following description, catalyst powders consisting of a metal and/or a metal oxide and containing at most a minor proportion of promoters are referred to as finely divided metal hydrogenation catalysts.

Preferably, the powdered contact material initially contains no more than a minor proportion by weight of material whose average particle diameter is greater than 250 microns. The greater proportion of the catalyst mass preferably comprises a material whose average particle diameter is smaller than 100 microns including at least 25 weight per cent of the material in a particle size smaller than 40 microns.

As a means of better understanding of the present invention reference will be made to the accompanying drawings, including Figures 1 and 2. Fig. 1 is a digrammatic illustration in elevation of an arrangement of apparatus for effecting the hydrogenation of carbon monoxide to produce normally liquid organic compounds in the presence of a finely divided contact material contained in reactors 7 and 21 in a so-called pseudo-liquid condition characterized by circulation of the finely divided particles within the catalyst mass suspended in the reaction mixture.

Fig. 2 of the drawing is a diagrammatic illustration in elevation of an arrangement of apparatus for effecting the synthesis of normally liquid organic compounds in which reactors 52 and 63 contain finely divided contact material entrained in the reaction mixture therein such that the movement of the catalyst particles is continuously in the direction of flow of the gaseous mixture through the respective reactors in accordance with the explanation embodied in my prior and co-pending application Serial No. 762,250, filed July 21, 1947, now U. S. Patent 2,543,974 in which I am co-inventor with Joseph W. Jewell.

In accordance with the process illustrated in Fig. 1 of the drawing which is not to be construed as to unnecessarily limit the present invention, a fresh feed gas comprising hydrogen and carbon monoxide together with minor proportions of carbon dioxide and other materials is introduced into the system through conduit 6 and may be combined with recycle gas comprising hydrogen and carbon monoxide from conduit 28. The ratio of hydrogen to carbon monoxide in the fresh feed with respect to the ratio of hydrogen to carbon monoxide in conduit 28 is adjusted such that the combined mol ratio of hydrogen to carbon monoxide introduced into reactor 7 through conduit 6 is preferably between about 1.5:1 and about 2:1. The gaseous reaction mixture passing through conduit 6 picks up catalyst from standpipe 29, such as a conventional reduced iron catalyst, and passes together therewith to reactor 7. Sufficient hot catalyst is picked up from conduit 29 to preheat the gas to a temperature of about 550° F. in order to initiate the hydrogenation reaction in reactor 7. Gas is passed through reactor 7 at a velocity between about 0.5 and about 5 feet per second such that a pseudo-liquid dense phase condition of the contact material is maintained therein, and preferably with an interface between a lower relatively dense phase and an upper relatively dilute phase. Reactor 7 is maintained at a temperature below about 700° F. by suitable cooling means, such as a cooling jacket surrounding the reactor or by cooling coils positioned within the reactor (not shown). Alternatively or additionally, cooling may be effected by removing a portion of the catalyst from reactor 7, cooling the catalyst, and returning the cooled catalyst to the reactor. When iron is used as the catalytic material in reactor 7, the temperature is maintained between about 500 and 600° F. therein. A suitable pressure for reactor 7 is between atmospheric and about 500 pounds per square inch gage, preferably a pressure between about 80 and about 250 pounds per square inch gage. The height of the dense phase or catalyst bed in reactor 7 is such that a contact time between catalyst and gases between about 2 and about 20 seconds is obtained to convert between about 50 and about 70 per cent of the carbon monoxide in the gaseous reaction mixture.

A gaseous reaction effluent comprising unreacted hydrogen and carbon monoxide, normally gaseous and liquid organic compounds and steam is removed from reactor 7 through conduit 8 and may be passed directly to a second reactor 21 through conduits 14 and 18. Entrainment of catalyst in the gaseous effluent is minimized or prevented by the use of cyclone separators or ceramic filters (not shown) positioned in the dilute phase within reactor 7.

Preferably, however, a portion or all of the reaction effluent in conduit 8 is passed to condenser 9 and to accumulator 11 for the separation of normally liquid products, such as water, hydrocarbons and oxygenated organic compounds. It is particularly desirable to remove water from the reaction mixture at this intermediate point in the synthesis process. These liquid products collect in accumulator 11 and are removed therefrom through conduit 12. Uncondensed vapors, including unreacted hydrogen and carbon monoxide, together with carbon dioxide and normally gaseous hydrocarbons, are removed from accumulator 11 and passed to the second reactor 21 through conduits 13, 14, and 18. If desired and if necessary, these gases may be preheated by heat exchange with the effluent from reactor 7 or by other conventional means not shown.

The gaseous mixture in conduit 18 contains a relatively high ratio of hydrogen to carbon monoxide as a result of the conversion of carbon monoxide in reactor 7. The preferred hydrogen to carbon monoxide mol ratio of this reaction mixture is above about 3:1. When the reaction mixture from reactor 7 does not contain a high enough ratio of hydrogen to carbon monoxide, additional hydrogen may be introduced into conduit 18 to obtain the desired ratio. Alternatively or additionally, a high hydrogen to carbon monoxide gas, such as that produced in the reforming of methane or that obtained by recycling gaseous components from conduit 27 to be discussed more fully hereinafter, may be introduced into conduit 18 as shown.

Contact material or catalyst is removed from reactor 7 through conduit 16 and is introduced into this gaseous mixture having a high ratio of hydrogen to carbon monoxide in conduit 18. Preferably, prior to introduction into conduit 18 the catalyst removed from conduit 7 is stripped of some of its relatively heavy organic compounds in standpipe 16 by the introduction of a suitable stripping gas, such as hydrogen, recycle gas, or steam through conduit 17. The resulting mixture of partially stripped catalyst and high hydrogen to carbon monoxide gas is passed through conduit 18 to a second reactor 21 in which carbon monoxide is substantially completely converted. The high hydrogen to carbon monoxide ratio of the reaction mixture in reactor 21 and the general operating conditions therein are such that substantially all of the relatively high boiling organic compounds and waxes are stripped or desorbed from the catalyst and any iron catalyst oxidized in reactor 7 is reduced in reactor 21. The gaseous velocity of the reaction mixture passed upward through reactor 21 is such that a pseudo-liquid dense phase of contact material is maintained therein similar to that maintained in reactor 7. It is preferred to maintain a temperature in reactor 21 substantially higher than that maintained in reactor 7, preferably a temperature between about 610 and about 650° F. when using a conventional reduced iron catalyst. The higher temperatures of reactor 21 aids in the desorption of the high boiling organic compounds on the surface of the catalyst. Lower pressures may also be used in reactor 21 than in reactor 7 as an aid in the desorption of waxes and organic materials from the catalyst. In general, the pressure of reactor 21 corresponds to the range given for reactor 7. Since reactor 21 is operated under conditions conducive to the hydrogenation of any oxides of iron, fresh catalyst is preferably introduced into the system by means of conduit 19 into conduit 18, which fresh catalyst may comprise unreduced iron or iron oxide. The reduction of the small amount of fresh catalyst is effected in reactor 21 thus eliminating the expensive prior reduction of fresh catalyst necessitated by conventional single stage operations. Under the preferred operating conditions of reactor 21, between about 80 and about 95 per cent of the carbon monoxide in the reaction mixture is converted.

A reaction effluent comprising excess hydrogen, steam, normally gaseous and liquid organic compounds, including hydrocarbons and oxygenated organic compounds, and in some instances small amounts of carbon monoxide, is removed from reactor 21 through conduit 22 and passed through condenser 23 to accumulator 24. In accumulator 24 normally liquid compounds, including hydrocarbons and water, are recovered as condensate from the reaction effluent. These liquid products are removed from accumulator 24 through conduit 26 as products of the process and may be combined with, or handled separately from, the liquid recovered in conduit 12. These liquid products may be subjected to further treatment and purification, if desired, without departing from the scope of this invention. Condenser 23 and accumulator 24 may represent a single recovery unit or a plurality of recovery units, such as fractionators including a depropanizer, for recovery of the valuable products of the process in a manner known to those skilled in the art.

As in reactor 7, suitable means, such as cyclone separators or ceramic filters (not shown), are provided within reactor 21 to remove entrained catalyst from the reaction effluent. The catalytic material which has been at least partially stripped of waxes and heavy organic compounds and which is substantially completely reduced is removed from reactor 21 through conduit or standpipe 29 and introduced into conduit 6 as previously described. If desired, the contact material in standpipe 29 may be further stripped of any remaining organic compounds by introduction of steam, hydrogen, recycle gas, or carbon dioxide through conduit 31. However, in most instances, it will be unnecessary to strip this contact material as the relatively high ratio of hydrogen to carbon monoxide in reactor 21 serves this purpose. Conduit 31 may, therefore, merely comprise means for introducing an aerating gas into the standpipe. Sufficient catalyst is removed from reactor 21 at a temperature above about 600° F. such that, when introduced into conduit 6, the temperature of the feed to reactor 7 is raised sufficiently high to initiate the hydrogenation reaction.

Normally gaseous components of the reaction effluent are removed from accumulator 24 through conduit 27 and may be passed to subsequent equipment (not shown) for further treatment and separation. The composition of this gaseous stream comprises unreacted hydrogen, carbon dioxide, methane, ethane, and in some instances nitrogen and carbon monoxide. This gas stream may also contain higher boiling hydrocarbons than ethane depending upon the degree of cooling effected by condenser 23. These gaseous components may be recycled, all or in part, through conduit 28. It is preferred, however, to remove a portion of the gaseous effluent through conduit 27 and pass same through a conventional carbon dioxide absorption system (not shown). The carbon dioxide free gas from the absorption system is passed to conduit 6 or to conduit 18 as previously described. Since the gas removed through conduit 27 comprises a large proportion of hydrogen, it conveniently may be used to adjust the hydrogen to carbon monoxide ratio in conduit 6 and/or in conduit 18 to the desired values in accordance with the teachings of this invention.

As in the case of reactor 7, reactor 21 may be provided with suitable cooling means (not shown) for maintaining the desired temperature conditions therein.

Fig. 2 of the drawing represents a preferred modification of the present invention as applied to a high velocity system in which the contact material is entrained in the gaseous reaction mixture and passes in the direction of flow of the gases through the reaction zone whereby the residence time of the contact material is controlled to prevent the build-up of waxes and carbonaceous deposits thereon to such an extent that such waxes and deposits cannot be removed by stripping. The embodiment of Fig. 2 represents a method of operation of a hydrogenation process using a catalyst, particularly reduced iron, in which the conventional regeneration of the catalyst, such as by oxidation and subsequent reduction can be eliminated entirely. According to Fig. 2 a gaseous reaction mixture comprising a relatively low ratio of hydrogen to carbon monoxide, preferably a mol ratio not greater than about 2:1, is passed through conduit 51 to a high velocity synthesis reactor 52. Recycle gas may be introduced into conduit 51 through conduit 87 to adjust the ratio of hydrogen to carbon monoxide to the desired value in a manner similar to that described with reference to Fig. 1. Synthesis feed gas picks up hot reduced iron catalyst from conduit or standpipe 66 in an amount sufficient to raise the temperature of the reaction mixture to that required to initiate the hydrogenation reaction, that temperature usually being about 550° F. with an iron catalyst. The gaseous reaction mixture containing entrained finely divided catalyst passes through the first stage reactor 52 and issues therefrom into a separator 53. The reaction conditions of reactor 52 are substantially the same as those described with reference to reactor 7 of Fig. 1 with the exception that the linear gas velocity is usually above about 5 feet per second such that the contact material is carried with the gaseous mixture into separator 53. At such high velocities, the residence time of the catalyst is comparatively short compared to the residence time of the catalyst in reactor 7 of Fig. 1; however, the residence time may be as much as 2 to 3 times as great as the residence time of the gaseous mixture in reactor 52 because of slippage of the contact material in the vertical section of reactor 52.

Contact material is separated from the reaction effluent in separator 53 by virtue of the decreased velocity of the gases resulting from the increased cross-sectional area of the separator. A gaseous reaction effluent containing unreacted hydrogen and carbon monoxide and normally gaseous and liquid organic compounds, including steam, and substantially free from entrained contact material, is passed from separator 53 through conduits 56 and 62 to the second stage reactor 63. The second stage reactor 63 corresponds substantially to reactor 21 of Fig. 1 as to operating conditions with the exception of the linear gas velocity. The gas velocity in reactor 63 is such that the contact material is carried with the gaseous mixture to a second separator 64, similar to that type of operation described with reference to reactor 52. Recycle gases from conduit 82 (to be more fully discussed hereinafter) are introduced into conduit 62 in order to maintain the mol ratio of hydrogen to carbon monoxide above about 3:1. Fresh feed of a relatively high ratio of hydrogen to carbon monoxide or substantially pure hydrogen may be introduced into the system at this point through conduit 62, as shown, if desired.

In separator 64 finely divided catalyst particles are separated from the gaseous effluent from the second stage reactor 63. Additional means, such as cyclone separators or filters not shown, may be provided internally or externally of separators 53 and 64 to assure substantially complete removal of catalyst from the gaseous effluent.

Catalyst or contact material separated from the reaction effluent in separator 53, in accordance with one modification of this invention, is treated to partially reduce any oxidized catalyst and to desorb and strip waxes and relatively high-boiling organic compounds therefrom by the introduction of a hydrogen containing gas, such as recycle gas, through conduits 72, 77 and 78. Stripped contact material at a relatively high temperature is introduced into conduit 62 in amounts sufficient to maintain the desired reaction and temperature in reactor 63. The stripping gas may be introduced in a plurality of points longitudinally along separator 53 and standpipe 54 as shown.

A gaseous effluent substantially free from catalyst is removed from separator 64 through conduit 67 and passed through condenser 68 to accumulator 69. Condenser 68 and accumulator 69 represents a single or a series of condensers or other separation recovery equipment, such as fractional distillation units, etc. Normally liquid hydrocarbons, oxygenated organic compounds and water are separated from the effluent and are collected in accumulator 69. These compounds are then removed from accumulator 69 through conduit 86 as products of the process. Normally gaseous components of the effluent including hydrogen, carbon dioxide, methane, ethane, and in some instances small amounts of carbon monoxide are removed from accumulator 69 through conduit 71 and at least a portion may be recycled to the second stage reactor 63 through conduits 72, 82, and 62. Since the hydrogen content of this recycle gas in conduit 72 is very high, the gaseous mixture is appropriate for use to adjust the hydrogen to carbon monoxide ratio in conduit 62 above a mol ratio of about 3:1. A portion of this gaseous mixture in conduit 72 having a high hydrogen content is passed to separator 53 and standpipe 54 as previously discussed to treat the catalytic material separated from the first reaction stage and to strip organic compounds therefrom. Another portion of the recycle gas of conduit 62 is passed to separator 64 and catalyst standpipe 66 by means of conduits 73, 74 and 76. As a result of the high hydrogen content of the gas oxidized catalyst is hydrogenated and relatively heavy organic compounds are stripped therefrom. Some of these relatively heavy organic compounds may also be hydrogenated to lower boiling compounds and removed with the effluent in conduit 67. A portion of the recycle gas in conduit 72 may be recycled to the first stage reactor 52, if desired, in order to adjust the hydrogen to carbon monoxide ratio therein by passage through conduits 73, 87, and 51.

Catalyst is removed from separator 64 through standpipe 66 and introduced into conduit 51 for recirculation to reactor 52. This catalyst has been substantially stripped of relatively high boiling organic compounds in the second stage reactor 63 and in separator 64. Metal oxides formed in the first reactor 52 are reduced by the high hydrogen content of the gaseous mixture in reactor 63 and/or separator 64. Sufficient catalyst at a relatively high temperature is passed through conduit or standpipe 66 to conduit 51 to preheat the gaseous mixture therein to a temperature sufficient to initiate the hydrogenation reaction.

Since the catalyst in the second stage reactor 63 undergoes a partial hydrogenation and relatively high boiling organic compounds are stripped therefrom and is thus reactivated and regenerated, it is desirable to continuously recirculate a major proportion of the catalyst in the system through the second stage reactor 63. This may be effected by passing a major proportion of the separated catalyst from separator 64 through conduit 81 to recycle gas conduit 72 and thence to separator 53 through conduits 77 and 78. From separator 53 the recycled catalyst is passed through standpipe 54 to conduit 62 where it is picked up by synthesis gas and passed through the second stage reactor 63 as previously discussed. In this manner of operation a major proportion of the catalyst in the system is continuously recirculated through reactor 63 and only a minor proportion of this recirculated catalyst is diverted through standpipe 66 to reactor 52. This method of operation assures a supply of catalyst to reactor 52 at substantially its highest activity at all times.

If the first stage reactor 52 and separator 53 are operated at a substantially higher pressure than second stage reactor 63 and separator 64, it will become necessary to provide means for overcoming the pressure differential therebetween. This may be accomplished by providing a longer standpipe from separator 64 than from separator 53, i. e., standpipe 66 being sufficiently longer than standpipe 54 to overcome the pressure differential between separator 64 and 53. Other conventional means may be provided, such as a Fuller Kinyon pump, for circulating and transferring catalyst without departing from the scope of this invention.

In a preferred modification of the present invention at least a substantial proportion of the normally liquid organic compounds and substantially all of the steam are removed from the reaction effluent in conduit 56 in order to decrease the partial pressure of these components in reactor 63 whereby stripping and desorbing of waxes and relatively heavy organic compounds in reactor 63 is facilitated and the conversion of carbon monoxide is favored. The removal of the normally liquid organic compounds and steam of the reaction effluent in conduit 56 is accomplished by passing the reaction stream through conduit 57, condenser 58 to accumulator 59. Condensate is collected in accumulator 59 and is removed therefrom through conduit 83. Uncondensed vapors from accumulator 59 are passed through conduits 61, 56 and 62 to reactor 63.

In effecting the synthesis reaction in both reactors 52 and 63 it may often become necessary to cool the reaction zones to maintain a relatively constant temperature therein. Various methods of cooling the reaction zone itself, such as by external cooling means or by injection of a cooling medium directly into the reaction mixture, may be practiced without departing from the scope of this invention. Such cooling medium may comprise a vaporizable liquid, such as water or an intermediate hydrocarbon fraction from the process, or a cooled gas. In addition it may be necessary to preheat the reaction mixture prior to entry into the reaction zone 52 in addition to the heat supplied by recirculating catalyst. Preheating may be accomplished by a conventional preheating furnace (not shown). Cooling and preheating are factors which will be characteristic of the particular apparatus being used and the particular conditions under which the reaction is effected.

As used herein, the term "fluidized condition" refers to the condition of the finely divided catalyst and includes both the dense pseudo-liquid phase condition and the entrained or continuous phase condition.

Various modifications of the reaction conditions and apparatus may become apparent to those skilled in the art without departing from the scope of this invention. Certain coolers, condensers, pumps, standpipes, and other auxiliary equipment have been eliminated from the drawing as a matter of convenience and clarity. A detailed discussion of general operating conditions and a suitable catalyst and its preparation is contained in my aforementioned co-pending application Serial No. 762,250.

Having described my invention, I claim:

1. A process for the hydrogenation of carbon monoxide which comprises passing a gaseous mixture comprising hydrogen and carbon monoxide through a first reaction zone, introducing finely divided catalyst into said first reaction zone, passing the gaseous mixture through said first reaction zone at a velocity sufficient to move substantially all of the finely divided catalyst in the direction of flow of the gases in said first reaction zone, maintaining a $H_2:CO$ ratio in the inlet gas to said first reaction zone not greater than about 2:1 and maintaining in said first reaction zone a conversion of carbon monoxide between about 50 and about 70 per cent to produce normally liquid organic compounds whereby relatively high boiling organic compounds are deposited on said catalyst but said deposits are minimized as a result of the positive movement and short residence time of the catalyst in the reaction zone, continuously withdrawing from said first reaction zone a reaction effluent containing unconverted hydrogen and carbon monoxide, normally liquid organic compounds, and entrained finely divided catalyst, separating entrained finely divided catalyst from said reaction effluent from said first reaction zone, contacting catalyst recovered from the effluent of said first reaction zone with a hydrogen-containing gas comprising recycle gas whereby relatively high boiling organic compounds are stripped from the catalyst, passing a gaseous mixture comprising unconverted hydrogen and carbon monoxide from said first reaction zone through a second reaction zone, introducing into said second reaction zone catalyst from said first reaction zone which has been separated and contacted with said hydrogen-containing recycle gas, maintaining a velocity in said second reaction zone sufficient to move substantially all of the finely divided catalyst therein in the direction of the flow of the gases therethrough, establishing in said second reaction zone a $H_2$:CO ratio not less than about 3:1, maintaining a conversion of CO in said second reaction zone at least about 80 per cent, withdrawing from said second reaction zone a reaction effluent containing normally liquid organic compounds as products of the process and entrained catalyst, separating entrained catalyst from the reaction effluent of said second reaction zone, contacting separated catalyst from said second reaction zone with a hydrogen-containing gas comprising recycle gas whereby relatively high boiling organic compounds are stripped from the catalyst and recycling catalyst thus contacted with hydrogen-containing gas comprising recycle gas from said second reaction zone to said first reaction zone.

2. The process of claim 1 in which a gaseous effluent is obtained from the stripping step in which the catalyst from said first reaction is contacted with a hydrogen-containing gas comprising recycle gas and such effluent is passed to said second reaction zone.

3. The process of claim 1 in which fresh make-up catalyst is introduced into said second reaction zone.

4. A process for the hydrogenation of carbon monoxide which comprises passing a gaseous mixture comprising hydrogen and carbon monoxide through a first reaction zone, introducing finely divided iron catalyst into said first reaction zone, passing the gaseous mixture through said first reaction zone at a velocity of at least 5 feet per second sufficient to move substantially all of the finely divided iron catalyst in the direction of flow of the gases in said first reaction zone, maintaining a $H_2$:CO ratio in the inlet gas to said first reaction zone not greater than about 2:1 and maintaining in said first reaction zone a conversion of carbon monoxide between about 50 and about 70 per cent to produce normally liquid organic compounds whereby relatively high boiling organic compounds are deposited on said catalyst but said deposits are minimized as a result of the positive movement and short residence time of the catalyst in the reaction zone, continuously withdrawing from said first reaction zone a reaction effluent containing unconverted hydrogen and carbon monoxide, normally liquid organic compounds, and entrained finely divided catalyst, separating entrained finely divided iron catalyst from said reaction effluent from said first reaction zone, contacting catalyst recovered from the effluent of said first reaction zone with a hydrogen-containing gas comprising recycle gas whereby relatively high boiling organic compounds are stripped from the catalyst, cooling the effluent from said first reaction zone to form condensate comprising water, after cooling said effluent from said first reaction zone passing unconverted hydrogen and carbon monoxide of said effluent through a second reaction zone, introducing into said second reaction zone iron catalyst from said first reaction zone which has been separated and contacted with said hydrogen-containing recycle gas, maintaining a velocity in said second reaction zone at least 5 feet per second sufficient to move substantially all of the finely divided catalyst therein in the direction of the flow of the gases therethrough, establishing in said second reaction zone a $H_2$:CO ratio not less than about 3:1, maintaining a conversion of CO in said second reaction zone at least about 80 per cent, withdrawing from said second reaction zone a reaction effluent containing normally liquid organic compounds and entrained catalyst, separating entrained catalyst from the reaction effluent of said second reaction zone, contacting separated iron catalyst from said second reaction zone with a hydrogen-containing gas comprising recycle gas whereby relatively high boiling organic compounds are stripped from the catalyst, recycling iron catalyst thus contacted with hydrogen-containing gas comprising recycle gas from said second reaction zone to said first reaction zone, and cooling the effluent from said second reaction zone to form condensate comprising water and a recycle gas phase.

WILLIAM BENEDICT JOHNSON.

REFERENCES CITED

The following references are of record in the file of this patent:

UNITED STATES PATENTS

| Number | Name | Date |
| --- | --- | --- |
| 2,360,787 | Murphree et al. | Oct. 17, 1944 |
| 2,417,164 | Huber, Jr. | Mar. 11, 1947 |
| 2,451,879 | Scharmann | Oct. 19, 1948 |
| 2,464,505 | Hemminger | Mar. 15, 1949 |
| 2,472,427 | Johnson | June 7, 1949 |
| 2,481,089 | Dickinson | Sept. 6, 1949 |